US008776732B2

(12) United States Patent  
Bredesen et al.

(10) Patent No.: US 8,776,732 B2  
(45) Date of Patent: Jul. 15, 2014

(54) RETRACTABLE LEASH

(76) Inventors: Carl S. Bredesen, Kailua, HI (US); Dale C McCarthy, Pensacola Beach, FL (US)

(*) Notice: Subject to any disclaimer, the term of this patent is extended or adjusted under 35 U.S.C. 154(b) by 144 days.

(21) Appl. No.: 13/408,312

(22) Filed: Feb. 29, 2012

(65) Prior Publication Data

US 2013/0219668 A1 Aug. 29, 2013

(51) Int. Cl.  
*A01K 27/00* (2006.01)  
*B65H 75/34* (2006.01)

(52) U.S. Cl.  
USPC .......................................... 119/770; 118/796

(58) Field of Classification Search  
USPC ......... 119/769, 770, 771, 772, 774, 779, 780, 119/781, 786, 787, 788, 789, 790, 791, 792, 119/793, 794, 795, 796, 797, 798, 856, 119/857; 182/231, 232, 236, 237; 224/162; 248/682, 693, 685, 329; 16/110.1, 422, 16/428; 242/378, 378.1, 378.2  
See application file for complete search history.

(56) References Cited

U.S. PATENT DOCUMENTS

| | | | | |
|---|---|---|---|---|
| 3,547,371 A * | 12/1970 | Gruseck | | 242/377 |
| 4,004,751 A * | 1/1977 | Weman et al. | | 242/384 |
| 4,938,725 A * | 7/1990 | Beck | | 441/75 |
| 5,490,805 A * | 2/1996 | Bredesen | | 441/75 |
| 5,938,492 A * | 8/1999 | Carlini | | 441/75 |
| 6,000,979 A * | 12/1999 | Stewart | | 441/75 |
| 6,290,158 B1 * | 9/2001 | Huang | | 242/379 |
| 6,419,175 B1 * | 7/2002 | Rankin, VI | | 242/373 |
| 2008/0072844 A1 * | 3/2008 | Konigsberg | | 119/770 |
| 2010/0037832 A1 * | 2/2010 | Smith | | 119/796 |
| 2011/0240787 A1 * | 10/2011 | Lee | | 242/384.6 |
| 2011/0312233 A1 * | 12/2011 | Starck et al. | | 441/75 |

* cited by examiner

*Primary Examiner* — Rob Swiatek  
*Assistant Examiner* — Ebony Evans  
(74) *Attorney, Agent, or Firm* — Michael Kroll

(57) ABSTRACT

A retractable leash having a tension strap connected to a safety line that can be releasably fastened to a tethered article. The retractable leash allows freedom of use of the tethered article without the retractable leash impinging any spring force on the tethered article.

A retractable leash that employ a series of metal rings, a plastic spacer and a flat sided ball that can rotate in any direction to guide and to prevent tangling of the tension strap and preclude friction from the plastic collar edges. A retractable leash that uses means of a furrow in the spring cup for locking the inner loop of the tension strap from rotating. A retractable leash having an arbor with a flat side for mounting a spring retaining clip thereto and a central bore that keeps debris out of the spring cup in sandy conditions.

2 Claims, 12 Drawing Sheets

RETRACTABLE LEASH

BACKGROUND OF THE INVENTION

1. Field of the Invention

The present invention relates to retractable leashes more specifically to:

a) A tension strap connected to a safety line that can be releasably fastened to a tethered article allowing freedom of use of the tethered article without the retractable leash impinging any spring force on the tethered article;

b) A collar mounted to the side aperture to allow the tension strap to extend and retract over a flat sided ball centrally mounted located between a spacer and two rings allowing the ball to rotate in any direction unison with the direction of the tension strap for guiding and prevent tangling while the two outer rings are to preclude extension strap friction on the outer edge of the collar;

c) A D-shaped arbor vertically extending from the arbor base plate provides a complementary shaped retaining clip that when mated to the arbor forms a substantially round arbor whose mating flat faces forms retainer for securing a coiled return spring thereto with this type of assembly of arbor, and spring retaining clip keeping debris from entering the spring cup especially in sandy conditions;

d) A tension strap having an inner loop that is attached to a furrow in the spring cup to prevent a rotational movement of the tension strap during extension and retraction; and e) A safety line designed so that the user can choose what strength they want, so that the safety line will be the weakest point and will break if needed and is a replaceable component instead of replacing the tension strap or the retractable unit itself.

2. Description of the Prior Art

There are other leash devices designed for tethering. While these tethering devices may be suitable for the purposes for which they were designed, they would not be as suitable for the purposes of the present invention, as hereinafter described.

SUMMARY OF THE PRESENT INVENTION

A primary object of the present invention is to provide a retractable leash having a tension strap attached to a safety line to secure a tethered article to an anchor article.

Another object of the present invention is to provide a retractable leash having a housing assembly containing a housing cover and an arbor base for a spring cup and a spring cup cover.

Yet another object of the present invention is to provide a retractable leash, wherein the spring cup contains a peripheral wall having an interior side and exterior side with the top of the peripheral wall having a plurality of shaped projections extending therefrom.

Still yet another object of the present invention is to provide a retractable leash with the spring cup cover having a plurality of correspondingly shaped snap slots as the projections on the peripheral wall, whereby the spring cup cover lockingly engages with the spring cup.

An additional object of the present invention is to provide a retractable leash with the interior side of the peripheral wall of the spring cup having a having a spring retaining slot and the exterior side of the peripheral wall having a furrow serving as a retainer for an inner loop attachment of the tension strap.

A further object of the present invention is to provide a retractable leash containing a coil spring positionable within the spring cup, wherein the coil spring has an outer lip and an inner lip, wherein the outer lip is shaped for placement within the spring retaining slot in the interior side of the peripheral wall of the spring cup.

A yet further object of the present invention is to provide a retractable leash, in which the inner end of the tension strap is positioned within the furrow in the exterior side of the peripheral wall of the spring cup, thereby anchoring the tension strap in a non-rotative fashion to the exterior side of the peripheral wall.

A still yet further object of the present invention is to provide a retractable leash with an arbor base having a centrally disposed bore with an arbor with a flat side extending there-from, wherein the arbor has a through-bore extending there-through, with the arbor further providing an arbor spring retaining clip attachably positioned within the bore of the arbor base, so that when placed therein the arbor spring retaining clip and the arbor have a substantially circular circumference.

Another object of the present invention is to provide a retractable leash, wherein the housing cover has a centrally disposed aperture, so that when the housing cover and the arbor base are matingly engaged the aperture of the housing cover and the through-bore of the arbor are co-aligned providing for positioning a fastener bolt therethrough.

Yet another object of the present invention is to provide a retractable leash, in which the spring cup and the spring cup cover have centrally disposed apertures, whereby the spring cup and the spring cup cover are mountable to the arbor serving as spindle for the spring cup and the spring cup cover to rotate thereabout.

Still yet another object of the present invention is to provide a retractable leash, in which the inner lip of the coil spring is mountable between the arbor and the arbor spring retaining clip, thereby anchoring the inner lip to the non-rotative arbor in the arbor base, so that rotation of the spring cup will create a spring tension force between the arbor base and the spring cup having the tension strap wound around the exterior side of the peripheral wall of the spring cup, thereby further tensioning the tension strap as the tension strap is extended from the housing cover.

An additional object of the present invention is to provide a retractable leash, in which at least one circumferential ridge is formed on the top of the arbor base providing a platform for the spring cup to rest upon, thereby reducing the frictional coefficient as the spring cup is rotated about the arbor when the tension strap extends from the housing cover and retracted thereinto by the stored coil spring when the tension strap is extended.

A further object of the present invention is to provide a retractable leash, in which the housing cover having a side aperture transversely extending therein, a collar coupled to the side aperture on the housing cover with the tension strap extendable and retractable through the collar.

A yet further object of the present invention is to provide a retractable leash containing a plurality of rings, a spacer positionable within the collar of the housing cover, a ball having a flat place rotatively retained by the spacer and a pair of rings with a pair of rings each positioned on opposing sides of the spacer, so that as the tension strap is extended and retracted one surface of the tension strap will remain in engagement with the flat face of the ball and as forces change on the tension strap the ball will rotate in unison with the tension strap, preventing the tension strap from twisting during retraction into the collar of the housing cover.

A still yet further object of the present invention is to provide a retractable leash, in which the two pairs of the rings are positioned within the housing cover collar approximate the interior and exterior ends, so that the tension strap contacts the interior ring surfaces and the flat face of the ball during extending and retracting the tension strap from the housing cover, thereby preventing damage to the collar of the housing cover during movement of the tension strap and wherein the rings are preferably manufactured from a non-corrosive metal.

Another object of the present invention is to provide a retractable leash, wherein the free end of the tension strap has a first connector from the safety line fixedly attached thereto, whereby the safety line can be releasably attached thereto.

Yet another object of the present invention is to provide a retractable leash in which the safety line has a first connector attachable to the tension strap and a second connector that can be releasably fastened via an attachment member to the tethered article.

Still yet another object of the present invention is to provide a retractable leash, wherein the second connector of the safety line is attachable to the attachment member containing hook and loop material that will engage with the tethered article, so as to be freely used without any spring force impinged upon the tethered article.

Additional objects of the present invention will appear as the description proceeds.

The present invention overcomes the shortcomings of the prior art by providing an extendable retractable tension strap having at its free end a first connector of a safety line, so that the safety line can be releasably fastened to a tethered article via an attachment member, allowing freedom of use of the tethered article without the tension strap impinging any spring force on the tethered article. The design of the safety line provides the user a choice as to what strength they want, so that it will break if needed.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
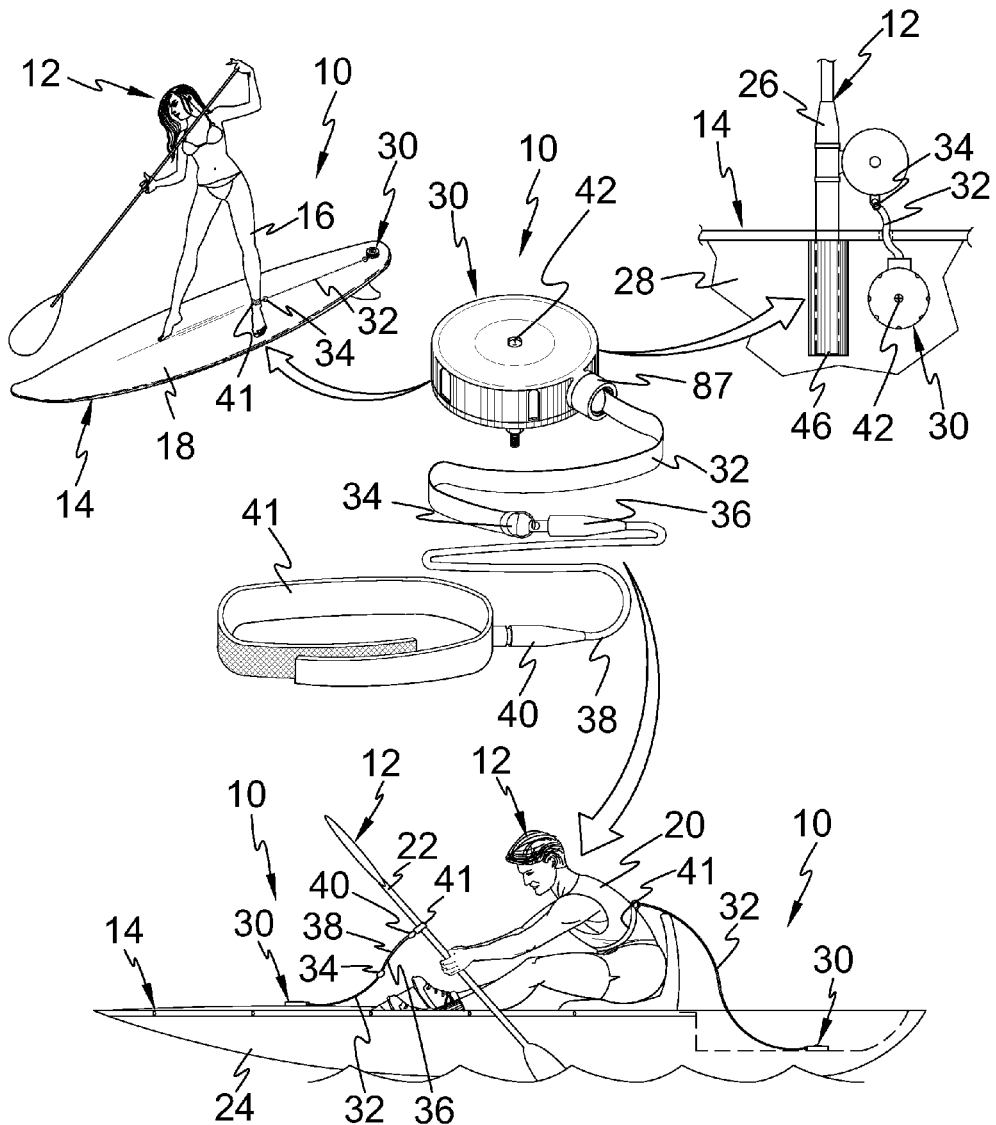
FIG. 1 is an illustrative view of the present invention in use on various anchor articles.

Turning now descriptively to the drawings, in which similar reference characters denote similar elements throughout the several views, the Figures illustrate the retractable leash of the present invention. With regard to the reference numerals used, the following numbering is used throughout the various drawing figures.

10 retractable leash
12 tethered article
14 anchor article
16 paddler for tethered article 12
18 paddleboard for anchor article 14
20 kayak user for tethered article 12
22 paddle for tethered article 12
24 kayak for anchor article 14
26 fishing rod for tethered article 12
28 boat for anchor article 14
30 housing assembly
32 tension strap
34 free end of tension strap 32
36 first connector on safety line 38
38 safety line
40 second connector on safety line 38
41 attachment member
42 fastener bolt
44 plug
46 rod holder
48 housing cover
50 arbor base
52 aperture in housing cover 48
53 bore in arbor base
54 arbor
55 through bore in arbor 54
56 spring cup
58 aperture in spring cup 58
59 interior compartment of spring cup 56
60 peripheral wall of spring cup 56
62 interior side of peripheral wall 60
64 exterior side of peripheral wall 60
66 top of peripheral wall 60
68 projection on top 66
70 snap slot in spring cup cover 72
72 spring cup cover
73 aperture in spring cup cover 72
74 coil spring
76 spring retaining slot on interior side 62
78 outer lip of coil spring 74

80 inner lip of coil spring 74
82 arbor spring retaining clip
84 furrow in exterior side 64
85 inner loop of tension strap 32
86 side aperture in housing cover 48
87 collar
88 ring in collar 87
90 flat sided ball in collar 87
92 spacer ring in collar 87
94 circumferential ridge on arbor base 50

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the present invention in use on various anchor articles. The present invention is a retractable leash pen for securing a tethered article 12 to an anchor article 14, such as paddler 16 to paddleboard 18, kayak user 20 or paddle 22 to kayak 24 and fishing rod 26 to boat 28. The retractable lease 10 contains a housing assembly 30 fastened to the anchor article 14 with a tension strap 32 having a free end 34 attached to a first connector 36 of a safety line 38 having a second connector 40 to an attachment member 41 attachable to the tethered article 12. The tension strap 32 may also be directly fastened to the tethered article 12 without using the safety line 38.

Figure 2:
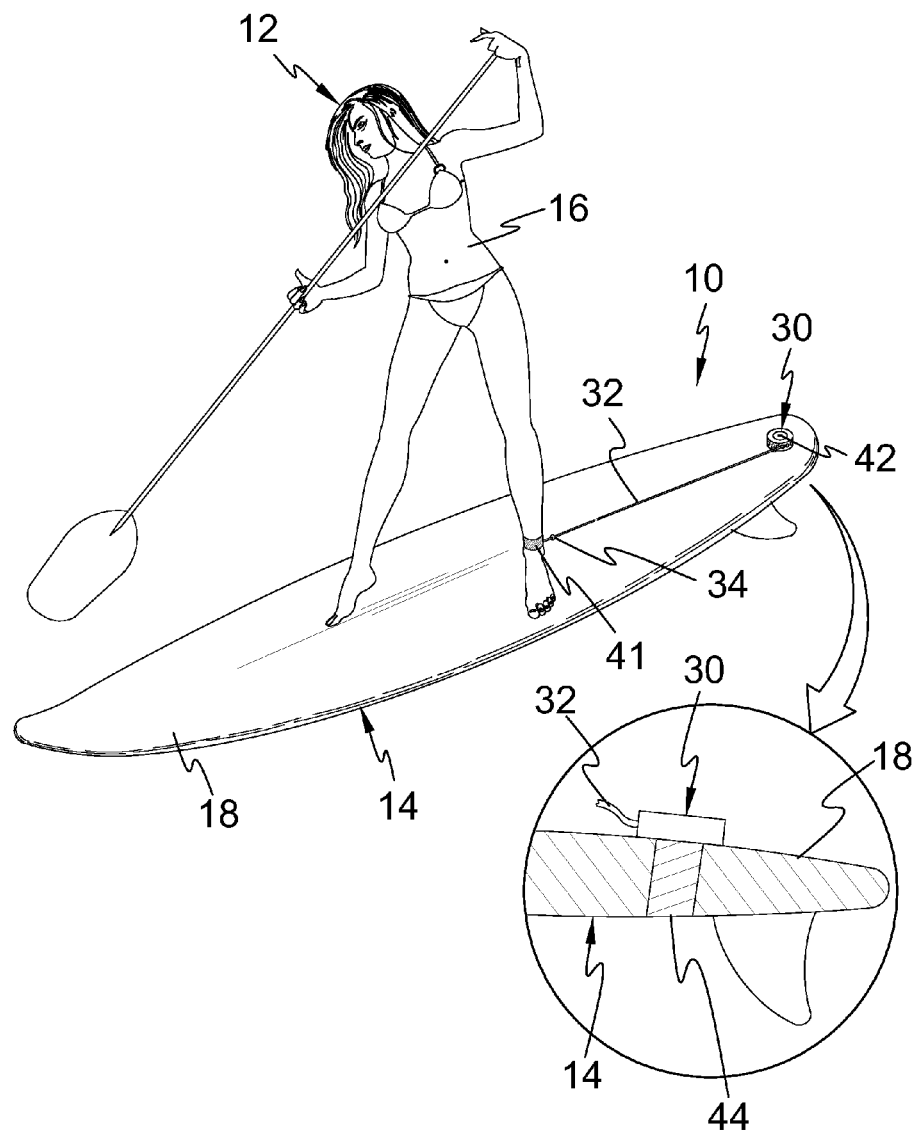
FIG. 2 is an enlarged perspective view of the present invention attached to a paddleboard and a cutaway view of a plug matingly bonded at the top and bottom of board.

Referring to FIG. 2, shown is an enlarged perspective view of the present invention attached to a paddleboard. The retractable leash 10 has the housing assembly 30 attached to the paddleboard 18. The housing assembly 30 stores the tension strap 32 therein. A fastener bolt 42 is for selectively attaching the housing assembly 30 to the anchor article 14. The housing assembly 30 can be fixedly bonded to the anchor article 14. The paddleboard 18, serving as the anchor article 14, has a plug 44 therein bonded to the top and bottom of the Paddleboard assembly 30, to prevent the removal of the housing assembly 30 therefrom.

Figure 3:
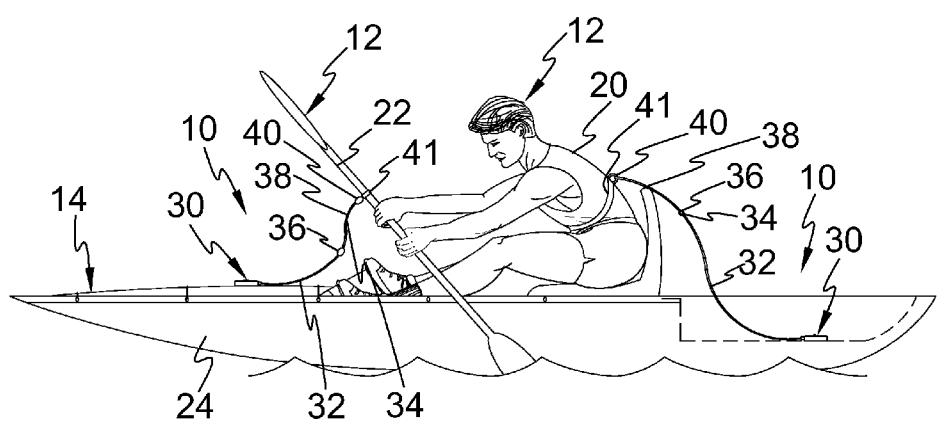
FIG. 3 is an enlarged side view of the present invention attached to a kayak.

Referring to FIG. 3, shown is an enlarged side view of the present invention attached to a kayak. The retractable leash 10 has the housing assembly 30 attached to the kayak 24. The tension strap 32 has the free end 34 fastened to the first connector 36 of the safety line 38, which provides freedom of movement with adequate separation for attachment to the paddler 16 or the paddle 22, so that when the paddler 16 or the paddle 22 becomes separated from the kayak 24, the tension strap 32 will pull out from the housing assembly 30 maintaining connection for easy retrieval of the paddle 22 or kayak 24.

Figure 4:
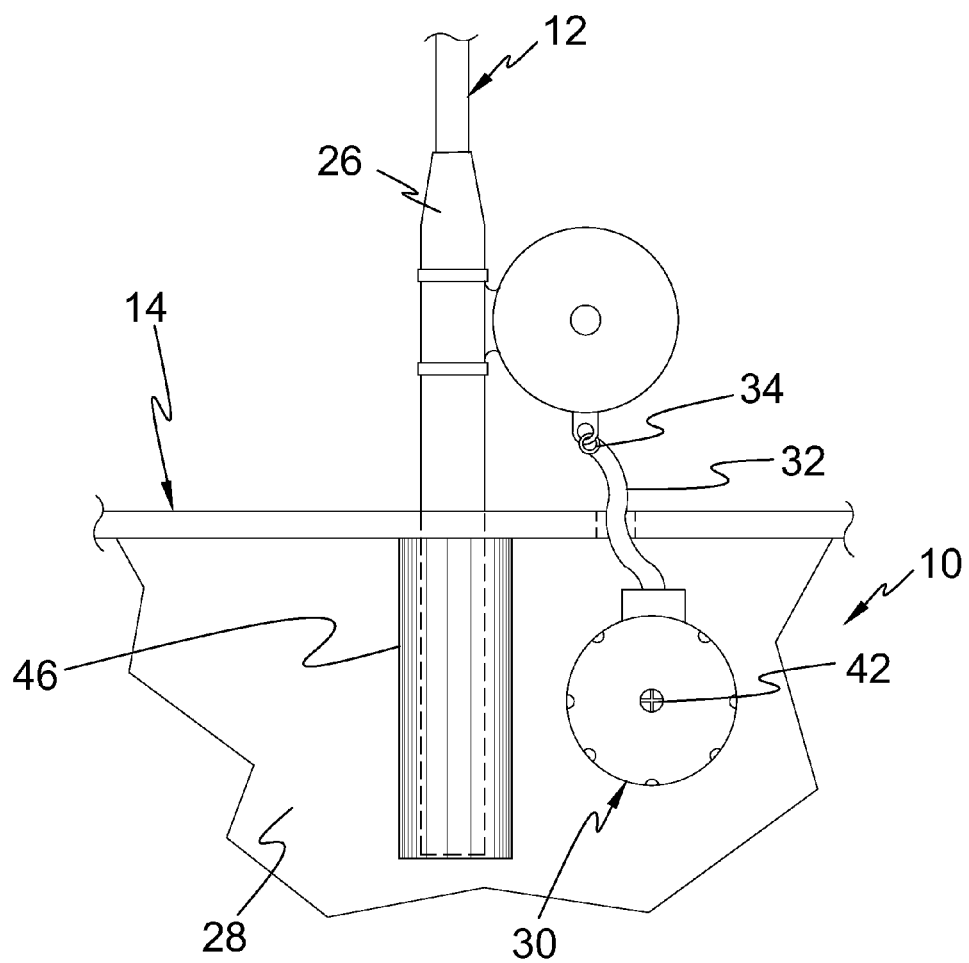
FIG. 4 is an enlarged side view, with parts broken away, of the present invention attached between a fishing rod and a boat without the safety line.

Referring to FIG. 4, shown is an enlarged side view, with parts broken away, of the present invention attached between a fishing rod and a boat without the safety line. The retractable leash 10 does not utilize the safety line 38. The retractable leash 10 has the housing assembly 30 attachable to a bulkhead or boat gunwale of the oat 28 by the fastener bolt 42. The housing assembly 30 stores the tension strap 32, in which the free end 34 is attached to the fishing rod 26. When the fishing rod 26 becomes separated from a rod holder 46 in the boat 28, the tension strap 32 will pull out from the housing assembly 30 maintaining connection between the fishing rod 26 and the housing assembly 30 for easy retrieval of the fishing rod 26.

Figure 5:
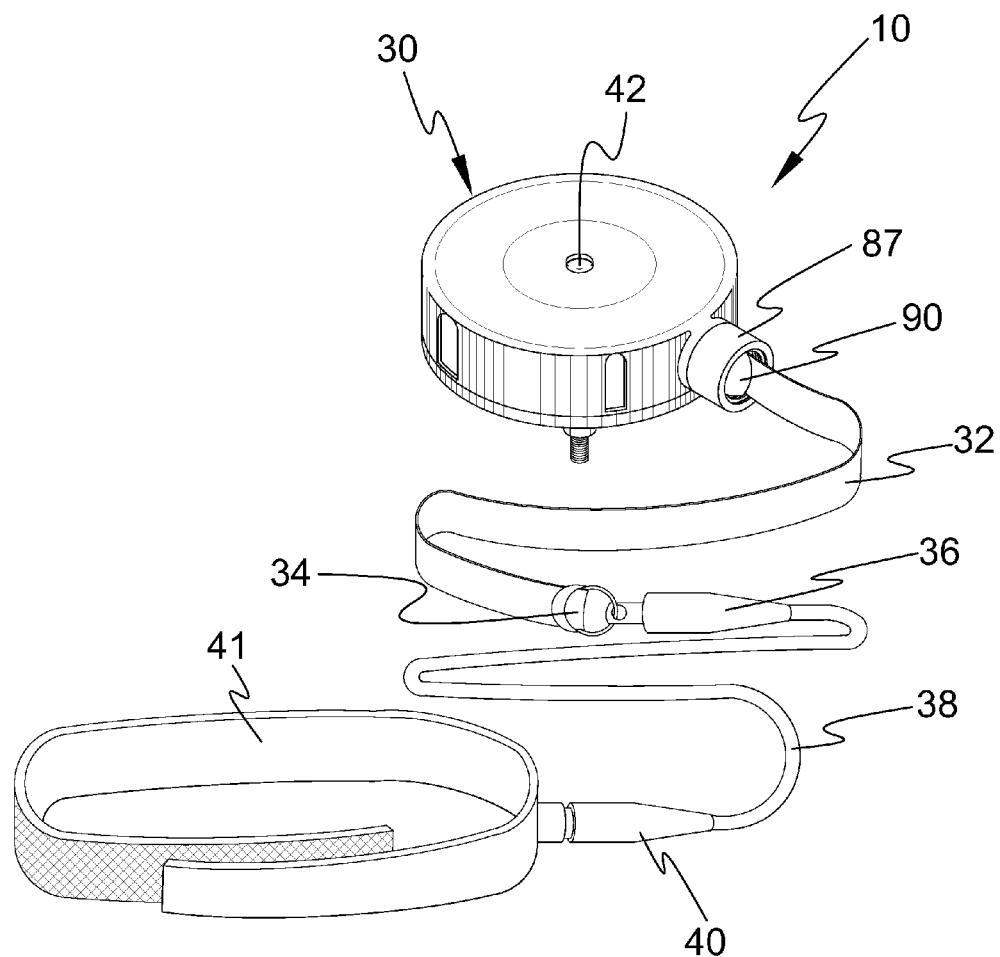
FIG. 5 is an enlarged perspective view of the present invention per se.

Referring to FIG. 5, shown is an enlarged perspective view of the present invention per se. The retractable leash 10 utilizes the safety line 38. The housing assembly 30 stores the tension strap 32 therein. The safety line 38 has an end with the first connector 36 attachable to the tension strap 32 with the second connector 40 connected to the attachment member 41, which can be attachable to the tethered article 12, such as the paddleboard 18, kayak 24, kayak paddle 22 and fishing rod 26. The safety line 38 allows for freely using the tethered article 12 without be encumbered by a force that would be applied by the tension strap 32. The length and material of the safety line 38 is an applicable design consideration depending on its application and further provides the retractable safety line 38 eliminating the need for replacing the tension strap or retractable unit should the safety line break.

Figure 6:
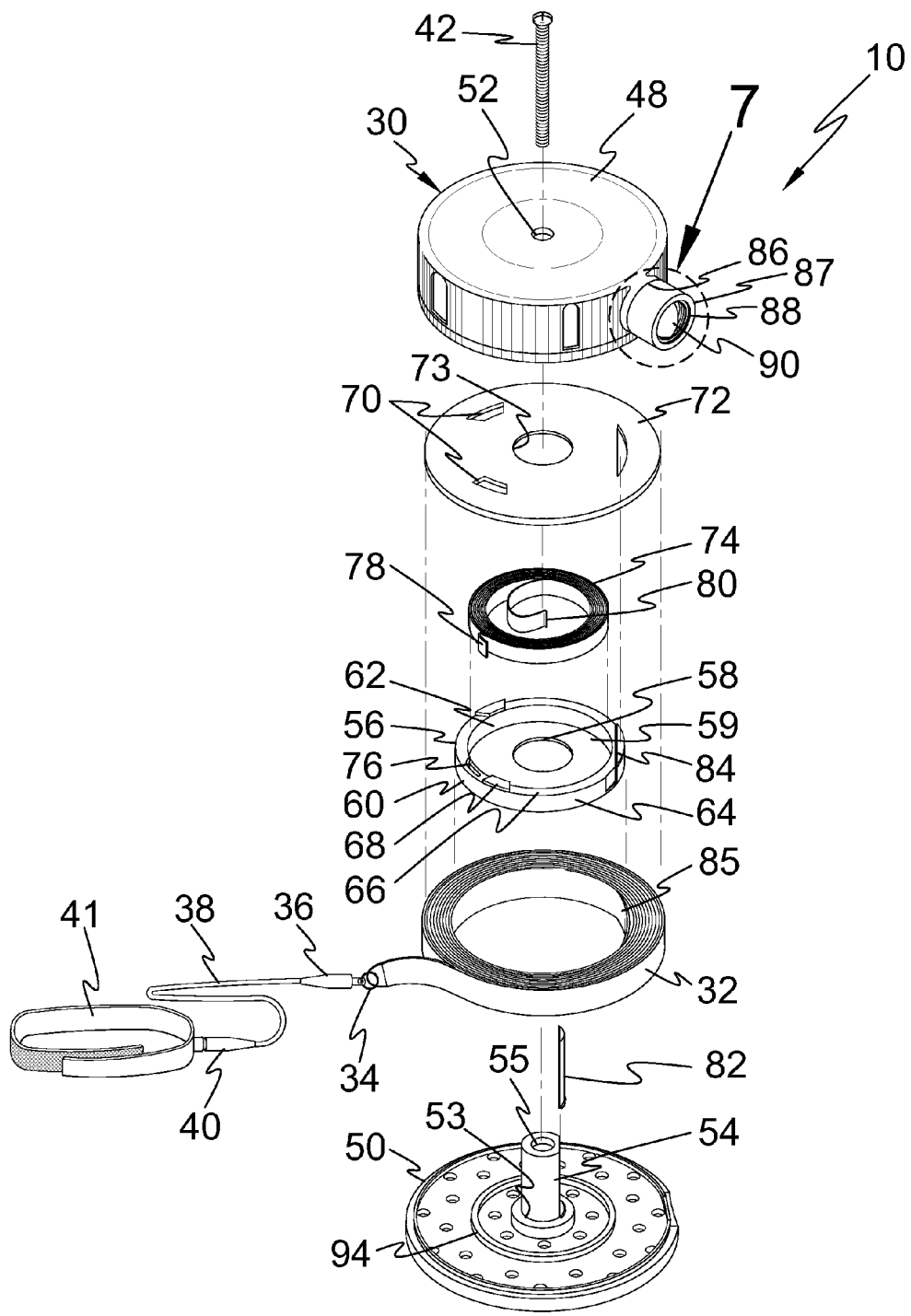
FIG. 6 is an exploded perspective view of the present invention.

Referring to FIG. 6, shown is an exploded perspective view of the present invention. The retractable leash 10 comprises the housing assembly 30 having the tension strap 32 and the safety line 38 attachable to the tension strap 32. The housing assembly 30 comprises a housing cover 48 and an arbor base 50 with the housing cover 48 having a centrally disposed aperture 52 with the arbor base 50 having a centrally disposed bore 53 for an arbor 54 having a through bore 55 that co-aligns with the aperture 52 in the housing cover 48 when they are matingly engaged by the fastener bolt 42. Further provided is a spring cup 56 having a centrally disposed aperture 58 mountable over the arbor 54 serving as a spindle, so that the spring up 56 freely rotates thereabout. The spring cup 56 has an interior compartment 59 bounded by a peripheral wall 60 having an interior side 62 and an exterior side 64, with top 66 of the peripheral wall 60 having a plurality of projections 68 that matingly engage correspondingly shaped snap slots 70 with a spring cup cover 72 having a centrally disposed aperture 73. The interior compartment 59 of the spring cup 56 houses a coil spring 74 with the interior side 62 of the peripheral wall 60 having a spring retaining slot 76 for securing an outer lip 78 of the coil spring 74 therein, with an inner lip 80 of the coil spring 74 fixedly attached to the arbor 54 by an arbor spring retaining clip 82. The spring cup 56 further has a furrow 84 within the exterior side 64 of the peripheral wall 60. The tension strap 32 is coiled about the exterior side 64 of the peripheral wall 60 of the spring cup 56 with the tension strap 32 having an inner loop 85 positioned between the furrow 84 in the exterior side 64, thereby anchoring the tension strap 32 to the spring cup 56. The free end 34 of the tension strap 32 extends through a side aperture 86 in the housing cover 48 and a collar 87 which has rings 88 and a flat sided ball 90 to prevent tangling of the tension strap 32 during extension and retraction. The free end 34 of the tension strap 32 also interconnects with the first connector 36 of the safety line 38 for attaching the replaceable safety line 38 thereto.

Figure 7:
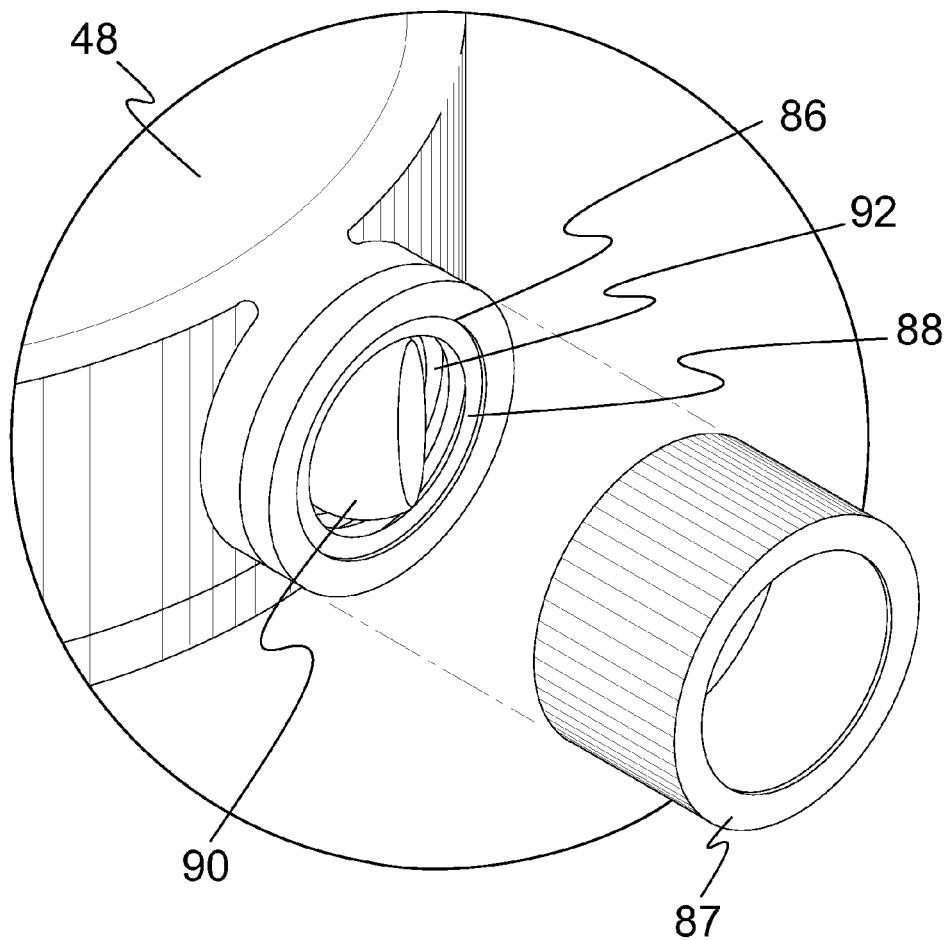
FIG. 7 is an enlarged partially exploded perspective view of the area indicated by arrow 7 in FIG. 6.

Referring to FIG. 7, shown is an enlarged perspective view of area indicated by arrow 7 in FIG. 6. The collar 87 of the housing cover 48 houses the rings 88 and a spacer 92 bounding the flat sided ball 90 to prevent the tension strap 32 from tangling by virtue of a transverse surface of the tension strap 32 always engaging the flat sided ball 90. Also shown is the collar 87 of the housing cover 48.

Figure 8:
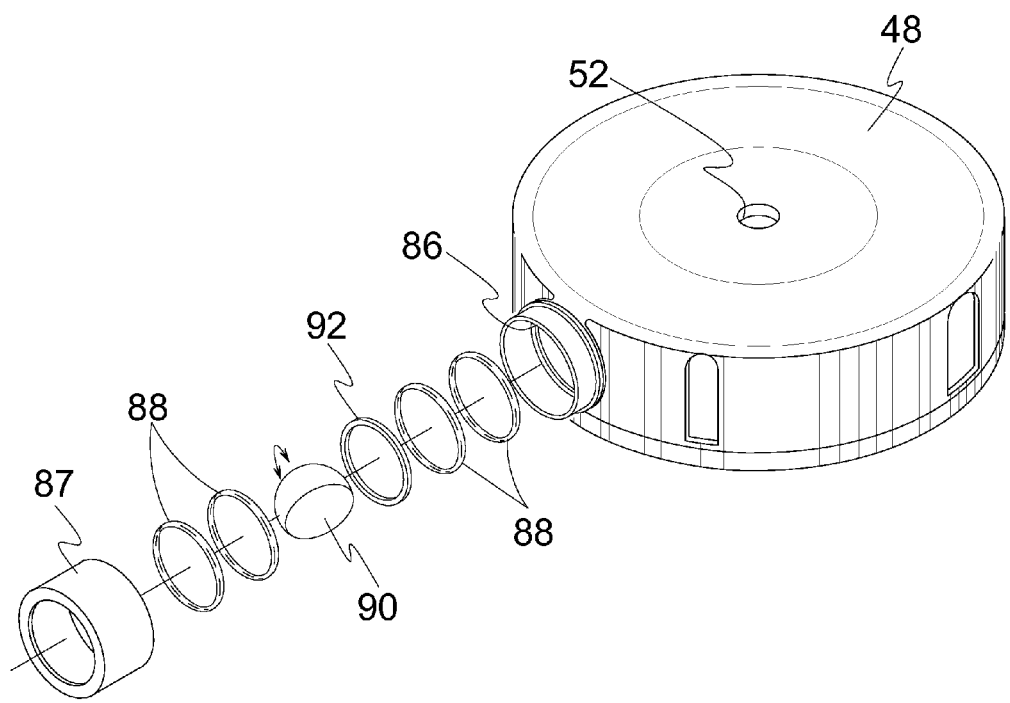
FIG. 8 is an enlarged exploded perspective view of the housing cover and associated components thereof.

Referring to FIG. 8, shown is an enlarged exploded perspective view of housing cover and associated components thereof. The housing cover 48 has the side aperture 86 which is specifically positioned across from the inner loop 85 of the tension strap 32 when the tension strap 32 is in its fully retracted position. The rings 88 that reside within the collar 87 are dimensioned, so that the tension strap 32 does not contact the collar 87, but slides on the interior portion of the furthest interior ring 88 and the nearest exterior ring 88 preventing the tension strap 32 from cutting into the collar 87. The two middle rings 88 having the spacer ring 92 therebetween, support the flat sided ball 90 and allows the flat sided ball 90 to rotate according to the pressure placed on the flat face of the flat sided ball by the tension strap 32 passing thereover, when extending from and retracting into the housing cover 48.

Figure 9:
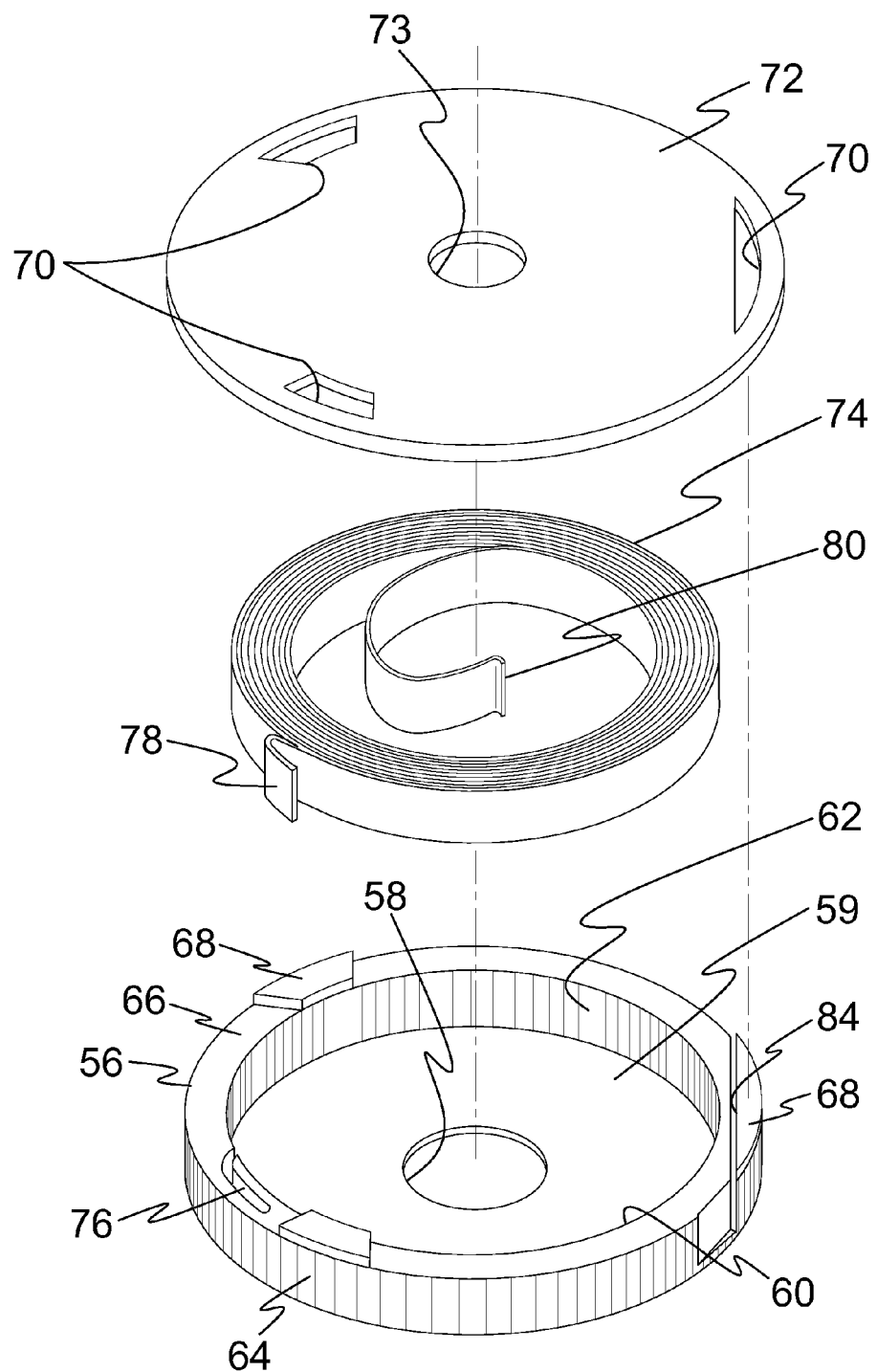
FIG. 9 is an enlarged exploded perspective view of the spring cup, spring cup cover and coil spring.

Referring to FIG. 9, shown is an enlarged exploded perspective view of the spring cup, cover and spring. The spring cup 56 has the centrally disposed aperture 58 mountable over the arbor 54 serving as a spindle, so that the spring cup 56 can freely rotate thereabout. The spring cup 56 has the interior compartment 59 bounded by the peripheral wall 60 having the interior side 62 and the exterior side 64 with the top 66 of the peripheral wall 60 having the plurality of projections 68 that matingly engage correspondingly shaped snap slots 70 within the spring cover 72. The interior compartment 59 of the spring cup 56 houses the coil spring 74 with the interior side 62 of the peripheral wall 60 having the spring retaining slot 76 for securing the outer lip 78 of the coil spring 74 and the inner lip 80 fixedly attached to the arbor 54 by the arbor spring retaining clip 82. The spring cup 56 further has the furrow 84 within the exterior side 64 for fixedly positioning the inner loop 85 of the tension strap 32 therein.

Figure 10:
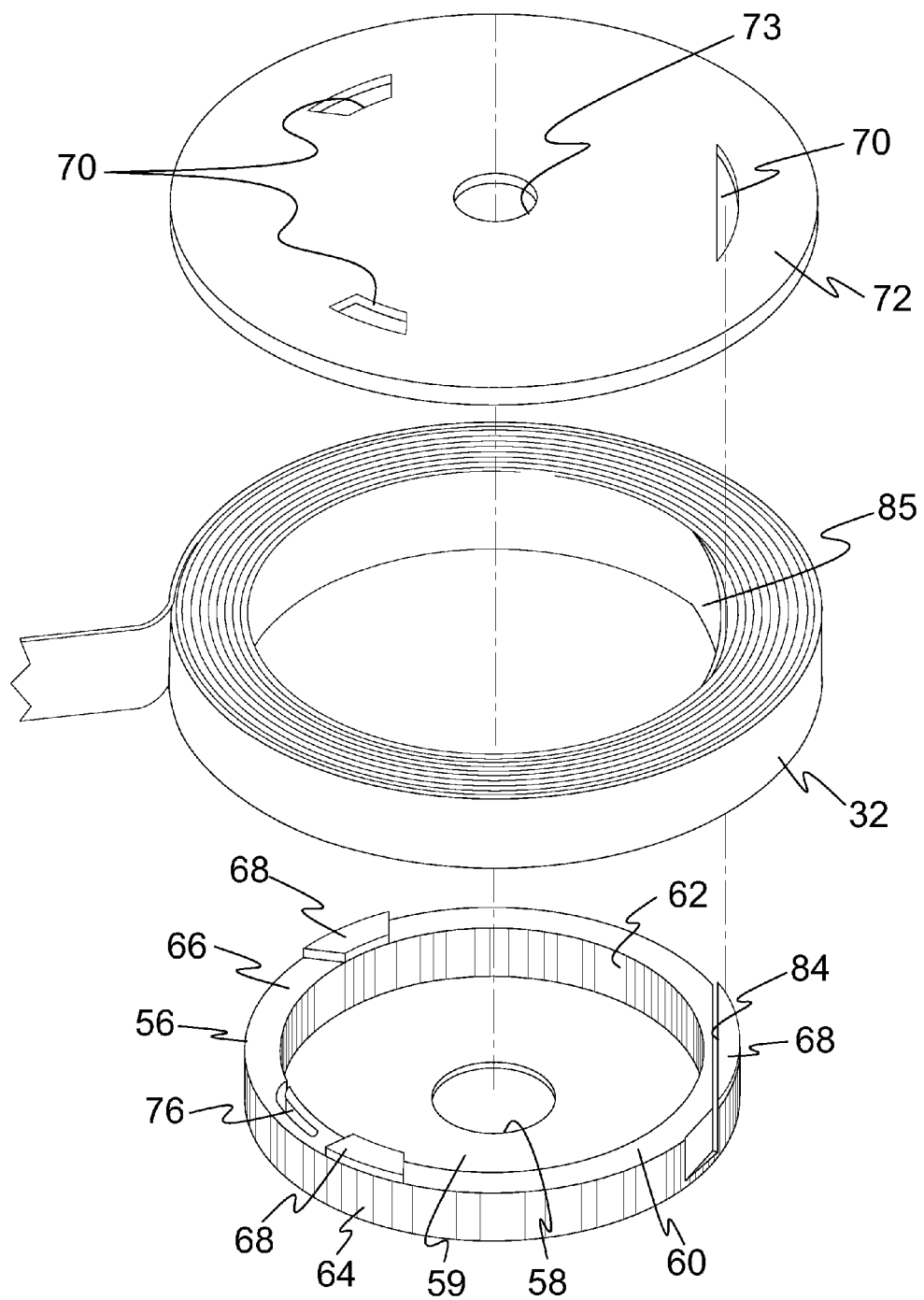
FIG. 10 is an enlarged exploded perspective view of the spring cup, spring cup cover and tension strap.

Referring to FIG. 10, shown is an enlarged exploded perspective view of the spring cup, spring cup cover and tension strap. The spring cup 52 with the interior compartment 59 is bounded by the peripheral wall 60 having the interior side 62 and the exterior side 64 with the top of the peripheral wall 60 having the plurality of projections 68 that matingly engage correspondingly shaped snap slots 70 with the spring cup cover 72. The spring cup 56 further has the furrow 84 within the exterior side 64 of the peripheral wall 60 for fixedly positioning the inner loop 85 of the tension strap 32 therein. The inner loop 85 is placed within the furrow 84 then wound about the exterior side 64 of the peripheral wall 60. The free end 34 of the tension strap 32 extends through the collar 87 of the housing cover 48 incorporating the rings 88 and the flat sided ball 90 to prevent tangling of the tension strap 32 during extension and retraction and to prevent the tension strap 32 from contacting the collar 87. The free end 34 of the tension strap 32 also engages the first connector 36 for attaching the replaceable safety line 38 thereto.

Figure 11:
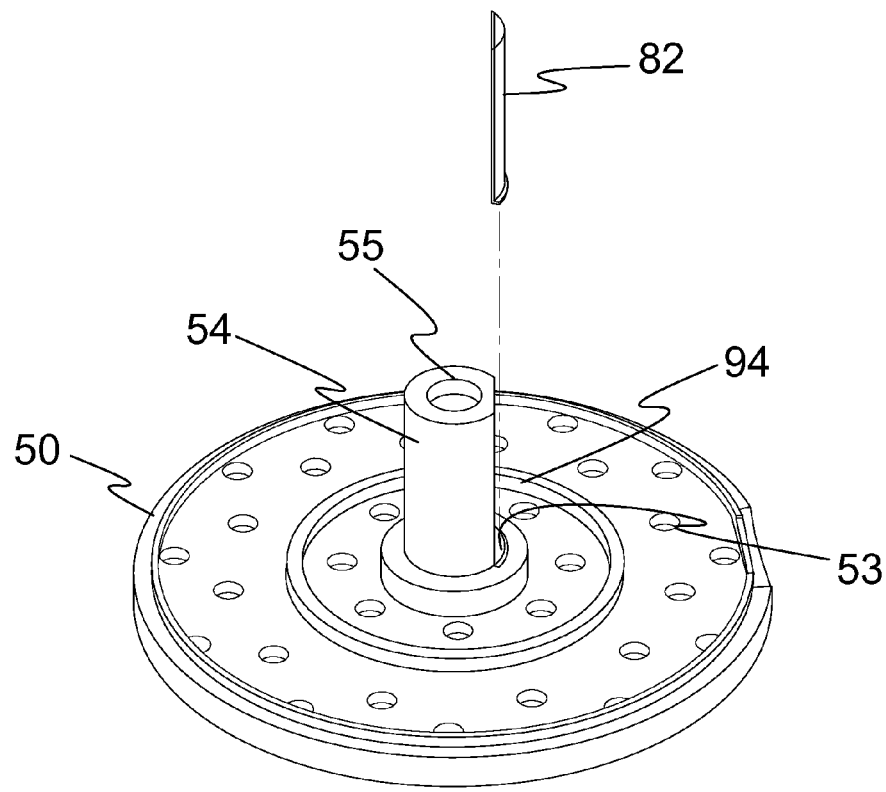
FIG. 11 is an enlarged perspective view of the arbor base, arbor and a spring retaining clip exploded therefrom.

Referring to FIG. 11, shown is an enlarged perspective view of the arbor base, arbor and the spring retaining clip exploded therefrom. The arbor base 50 as a circumferential ridge 94 thereon with the centrally disposed arbor having the through bore 55 in the bore 53 of the arbor base 50 that co-aligns with the aperture 52 in the housing cover 48 when they are mating engaged by the fastener bolt 42. The arbor 54 serves as a spindle, so that the spring cup 56 freely rotates thereabout on the circumferential ridge 94. The arbor 54 further provides a flat side for the arbor spring retaining clip 82 that serves to fixedly attach the inner lip of the coil spring 74 between the arbor 54 the and the arbor spring retaining clip 82.

Figure 12:
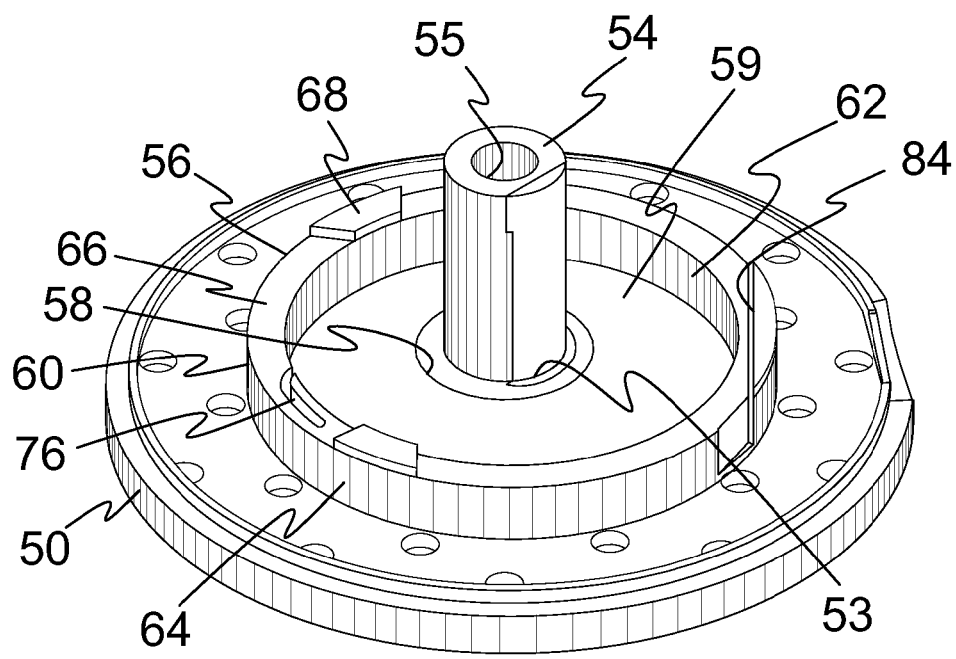
FIG. 12 is an enlarged perspective view of the arbor base, arbor, spring retaining clip and the spring cup mounted thereon.

Referring to FIG. 12, shown is an enlarged perspective view of the arbor base, arbor, spring retaining clip and the spring cup mounted thereon. The arbor base 50 has the spring cup 56 mounted thereon. The arbor base 50 has the centrally disposed arbor 54 that co-aligns with the aperture 52 in the housing cover 48 when they are matingly engaged by the fastener bolt 42. The spring cup 56 having the centrally disposed aperture 58 is mountable over the arbor 54 that serves as a spindle, so that the spring cup 56 freely rotates thereabout. The spring cup 56 has the interior compartment 59 bounded by the peripheral wall 60 having the interior side 62 and the exterior side 64 with the top 66 of the peripheral wall 60 having the plurality of projections 68 that matingly engage with the correspondingly shaped snap slots 70 with the spring cup cover 72. The interior compartment 59 of the spring cup 56 serves as a housing for the coil spring 74 with the interior side 62 of the peripheral wall 60 having the spring retaining slot 76 for securing the outer lip 78 of the coil spring 74 therein with the inner lip 80 fixedly attached to the arbor 54 by the arbor spring retaining clip 82. The exterior side b of the peripheral wall 60 has the furrow 84 for receiving the inner loop 85 of the tension strap 32 therein, as the tension strap 32 is coiled about the exterior side 64 of the peripheral wall 60 of the spring cup 56 thereby securing the tension strap 32 to the rotative spring cup 56.

What is claimed is:

1. A retractable leash for attaching a tethered article to an anchor article, the retractable leash comprising:
   a) a housing assembly;
   b) an elongated tension strap extendable from and retractable into the housing assembly;
   c) means for attaching the housing assembly to the anchor article whereby a free end of the tension strap can be connected to the tethered article, said means comprising a fastener bolt extending through a center of the housing assembly and into the anchor article;
   d) said housing assembly comprising a housing cover having a centrally disposed aperture, an arbor base having a centrally disposed bore, an arbor having a through bore and mounted vertically in the bore in the arbor base, whereby the through bore in the arbor co-aligns with the aperture in the housing cover when matingly engaged by the fastener bolt, and an arbor having a flat side fitted with spring retaining clip; and
   e) said housing cover having a side aperture, a collar mounted over the side aperture of the housing cover for the extension strap to extend therefrom, two outer rings carried within the collar; to preclude extension strap friction on outer edge of collar, a spacer ring carried within the collar centrally located between each two inter rings; and to provide a track for a flat sided ball rotatably mounted within the inter rings, whereby when the extension strap extends from the collar, the flat sided ball will rotate in any direction and guide in unison with the tension strap during extension and retraction and prevent tangling.

2. A retractable leash for attaching the tethered article to an anchor article, the retractable leash comprising:
   a) a housing assembly;
   b) an elongated tension strap extendable from and retractable into the housing assembly;
   c) means for attaching the housing assembly to the anchor article whereby a free end of the tension strap can be connected to the tethered article, said means comprising a fastener bolt extending through a center of the housing assembly and into the anchor article;
   d) said housing assembly comprising a housing cover having a centrally disposed aperture, an arbor base having a centrally disposed bore, an arbor having a through bore and mounted vertically in the bore in the arbor base, whereby the through bore in the arbor co-aligns with the aperture in the housing cover when matingly engaged by the fastener bolt, and an arbor having a flat side fitted with spring retaining clip;
   e) the housing assembly further comprising a spring cup having a centrally disposed aperture mountable over the arbor which serves as a spindle, so that the spring cup freely rotates thereabout;

f) the spring cup comprises an interior compartment bounded by a peripheral wall having an interior side and an exterior side, with top of the peripheral wall having a plurality of projections thereon;
g) the housing assembly further comprising a coil spring having an outer lip and an inner lip, wherein the inner lip is fixedly attached to the arbor by the arbor spring retaining clip and the outer lip is fixedly attached into the spring retaining slot in the spring cup;
h) the spring cup further comprising the exterior side of the peripheral wall having a furrow formed therein, whereby an inner loop of the tension strap engages with the furrow with the tension strap wrapped around the exterior side of the peripheral wall of the spring cup; and
i) the housing assembly further comprising a spring cup cover having a centrally disposed aperture and a plurality of snap slots that matingly engage with the projections on the top of the wall of the spring cup.

* * * * *